(12) United States Patent
Latter et al.

(10) Patent No.: US 7,227,931 B1
(45) Date of Patent: Jun. 5, 2007

(54) METHOD AND SYSTEM FOR PROVIDING ENHANCED CALLER IDENTIFICATION SCREENING USING AUDIBLE CALLER NAME ANNOUNCEMENT

(75) Inventors: Teresa Farias Latter, Kildeer, IL (US); Nancy Ann Book, Naperville, IL (US); Mary Louise Hardzinski, Palatine, IL (US); James Thomas Maciejewski, Spring Grove, IL (US); John Wesley Moss, Lake Zurich, IL (US); Thomas Joseph McBlain, Arlington Heights, IL (US); Steven Darrell Benfield, Raleigh, NC (US); Robin Denise Brady, Purcellville, VA (US); Walden Blaine Crabtree, Jr., Raleigh, NC (US); Tracy Lynn Kato, Raleigh, NC (US); Brian Scott Utesch, Raleigh, NC (US)

(73) Assignee: SBC Holdings Properties, L.P., Reno, NV (US)

( * ) Notice: Subject to any disclaimer, the term of this patent is extended or adjusted under 35 U.S.C. 154(b) by 1245 days.

(21) Appl. No.: 09/684,828

(22) Filed: Oct. 10, 2000

Related U.S. Application Data

(63) Continuation of application No. 09/122,165, filed on Jul. 24, 1998, now Pat. No. 6,178,232.

(51) Int. Cl.
*H04M 1/64* (2006.01)

(52) U.S. Cl. .............. 379/88.21; 379/215.01; 379/142.08; 455/563

(58) Field of Classification Search ........... 379/88.26, 379/88.16, 142.01, 142.02, 142.03–142.06, 379/142.08, 201.01, 207.01, 207.06, 207.07, 379/210.02, 210.03, 213.01, 88.02, 215.01, 379/284, 374, 142, 88.19, 88.2, 88.21, 67.1, 379/196, 197, 199, 201, 207, 210, 213, 229, 379/230; 455/563
See application file for complete search history.

(56) References Cited

U.S. PATENT DOCUMENTS

| 4,899,358 | A | * | 2/1990 | Blakley ............... 379/284 |
| 5,033,076 | A | | 7/1991 | Jones et al. ........... 379/88.2 |
| 5,341,414 | A | | 8/1994 | Popke ................ 379/142 |

(Continued)

OTHER PUBLICATIONS

Harry Newton, Newton's Telecom Dictionary, 8th Ed., Flatiron Publishing, Inc., ISBN 0-936648-60-0, p. 1051.*

(Continued)

*Primary Examiner*—Gerald Gauthier
(74) *Attorney, Agent, or Firm*—Brinks Hofer Gilson & Lione

(57) ABSTRACT

A method and system provide enhanced caller identification information to a called party. The system determines whether or not standard caller identification information associated with a calling party can be provided to the called party. The system preferably determines whether the standard caller identification information is unavailable, incomplete or has been blocked. When the system determines that the standard caller identification information cannot be provided, the system transmits a request for audible caller identification information to the calling party. If the calling party provides the requested audible caller identification information, the audible caller identification information is transmitted to the called party. The called party is thus provided with information about the calling party that can assist the called party in deciding whether or not to answer the call.

20 Claims, 7 Drawing Sheets

U.S. PATENT DOCUMENTS

| | | | |
|---|---|---|---|
| 5,497,414 A | | 3/1996 | Bartholomew ............... 379/142 |
| 5,511,111 A | * | 4/1996 | Serbetcioglu et al. .... 379/88.01 |
| 5,521,969 A | | 5/1996 | Paulus et al. ................ 379/142 |
| 5,526,406 A | * | 6/1996 | Luneau ........................ 455/563 |
| 5,533,106 A | | 7/1996 | Blumhardt .................. 379/142 |
| 5,548,636 A | | 8/1996 | Bannister et al. ........... 379/201 |
| 5,590,184 A | | 12/1996 | London ....................... 379/142 |
| 5,594,784 A | * | 1/1997 | Velius ...................... 379/88.02 |
| 5,604,792 A | | 2/1997 | Solomon et al. ......... 379/88.23 |
| 5,668,862 A | | 9/1997 | Bannister et al. ........... 379/201 |
| 5,729,592 A | * | 3/1998 | Frech et al. ............. 379/88.19 |
| 5,796,806 A | * | 8/1998 | Birckbichler .............. 379/88.2 |
| 5,802,148 A | * | 9/1998 | Sizer, II .................. 379/88.19 |
| 5,848,142 A | | 12/1998 | Yaker ......................... 379/215 |
| 5,850,435 A | * | 12/1998 | Devillier ..................... 379/374 |
| 5,905,774 A | | 5/1999 | Tatchell et al. .......... 379/88.04 |
| 5,999,599 A | * | 12/1999 | Shaffer et al. ........... 379/93.23 |
| 6,178,232 B1 | * | 1/2001 | Latter et al. ............. 379/88.21 |
| 6,252,953 B1 | * | 6/2001 | Gruchala et al. ...... 379/207.01 |
| 6,332,021 B2 | * | 12/2001 | Latter et al. ........... 379/142.01 |
| 6,498,841 B2 | * | 12/2002 | Bull et al. ............. 379/142.08 |
| 6,633,634 B1 | * | 10/2003 | Crockett et al. ....... 379/215.01 |

OTHER PUBLICATIONS

Mason, C. 'Wireless Carriers Add New Services to their Bag of Tricks', May 16, 1994, Telephony, ISSN: 00402656, vol. 226, Iss. 20, p. 7.*

Ghosal, A. 'An Application of IN Technology for 800 MHz PCS', 1994, Universal Personal Communications, ISBN: 0-7803-1823-4, Record 3rd Ann. Intl. Conf., pp. 624-628.*

McDonald, M. 'ClassCo bows Cidney caller ID', Dec. 9, 1996, Twice, ISSN: 08927278, vol. 11, Iss, 23, p. 24.*

Harry Newton, Newton's Telecom Dictionary, 8th Ed., Flatiron PUblishing, Inc., ISBN 0-936648-60-0, p. 1051.*

* cited by examiner

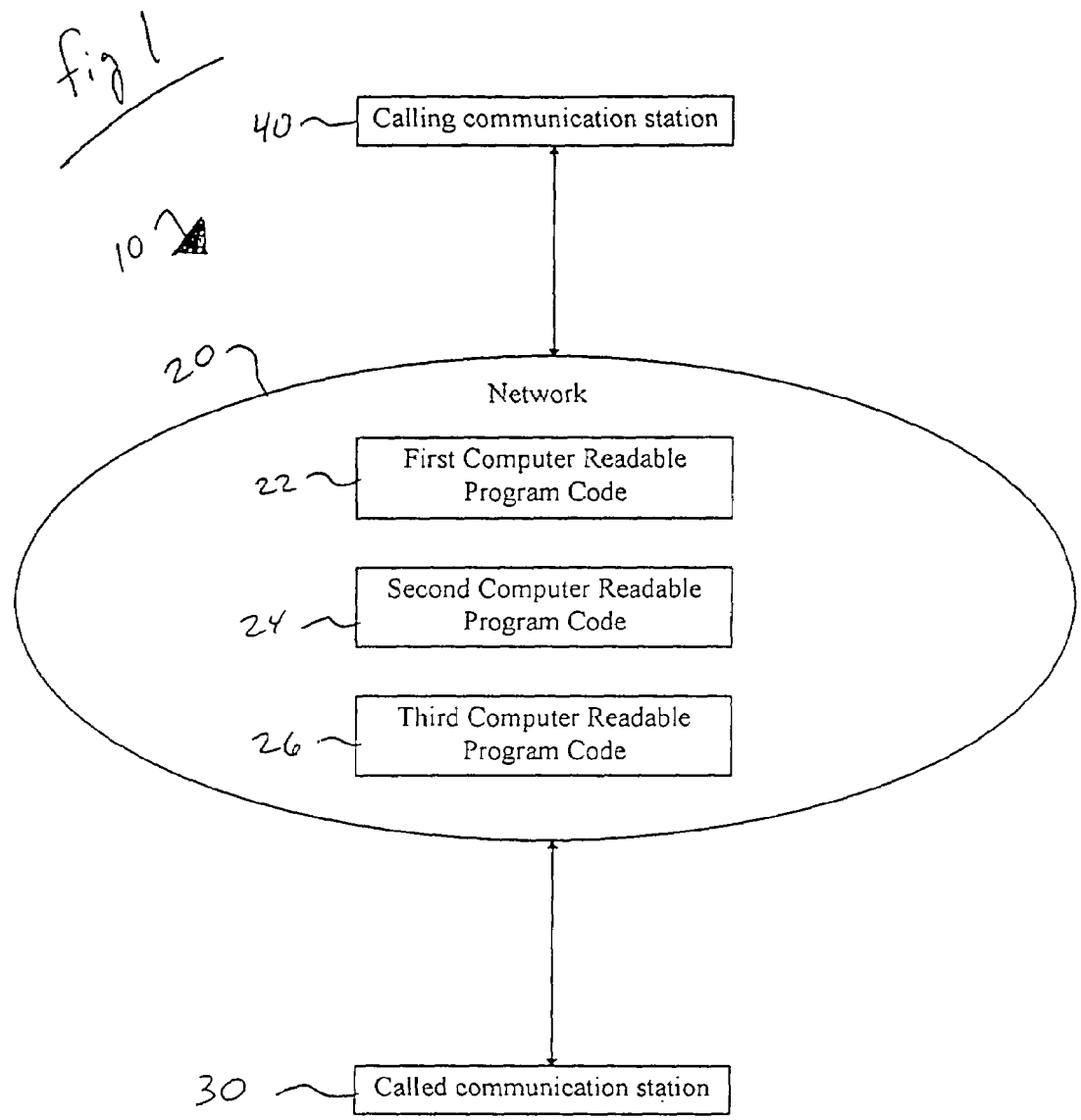

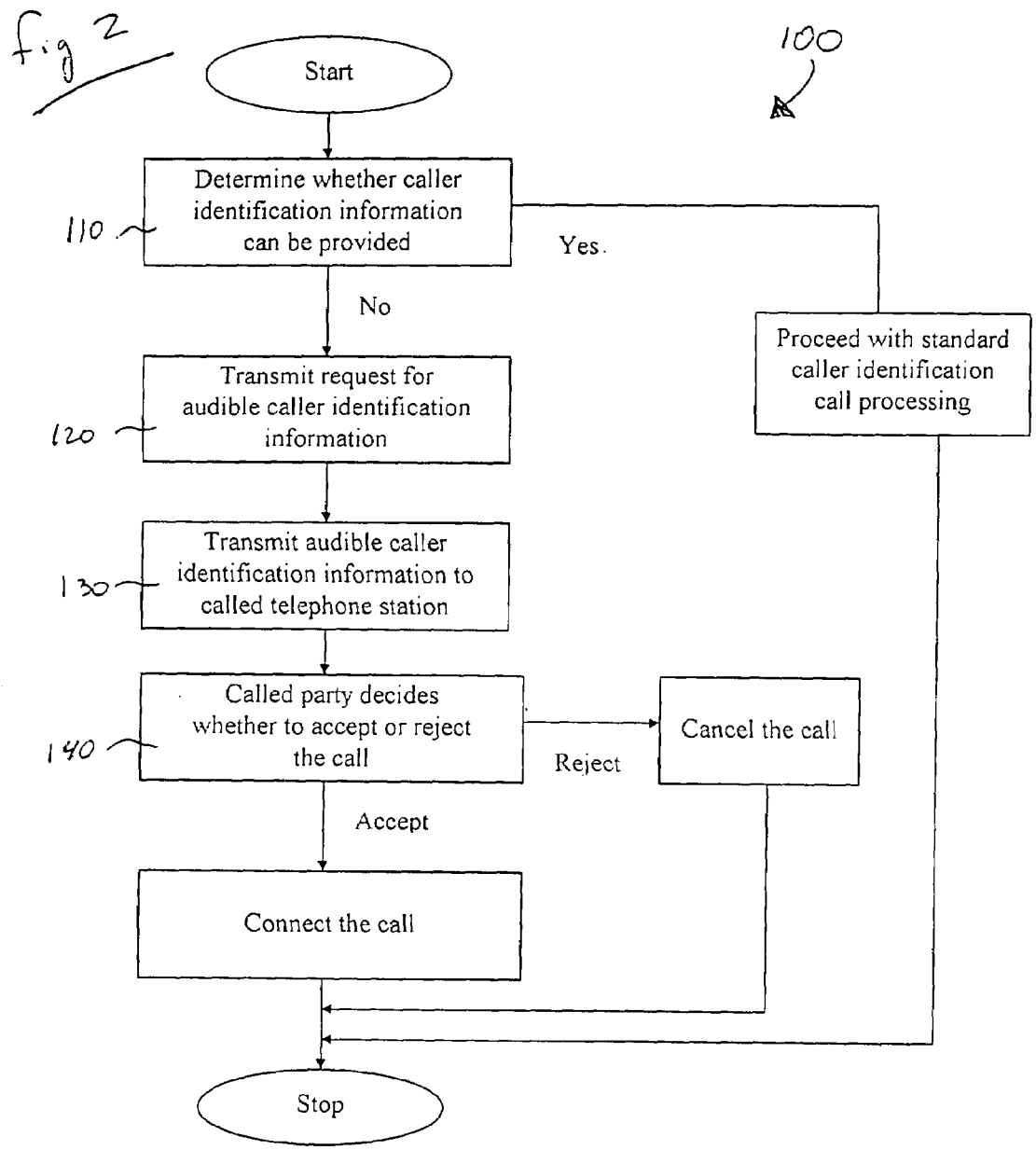

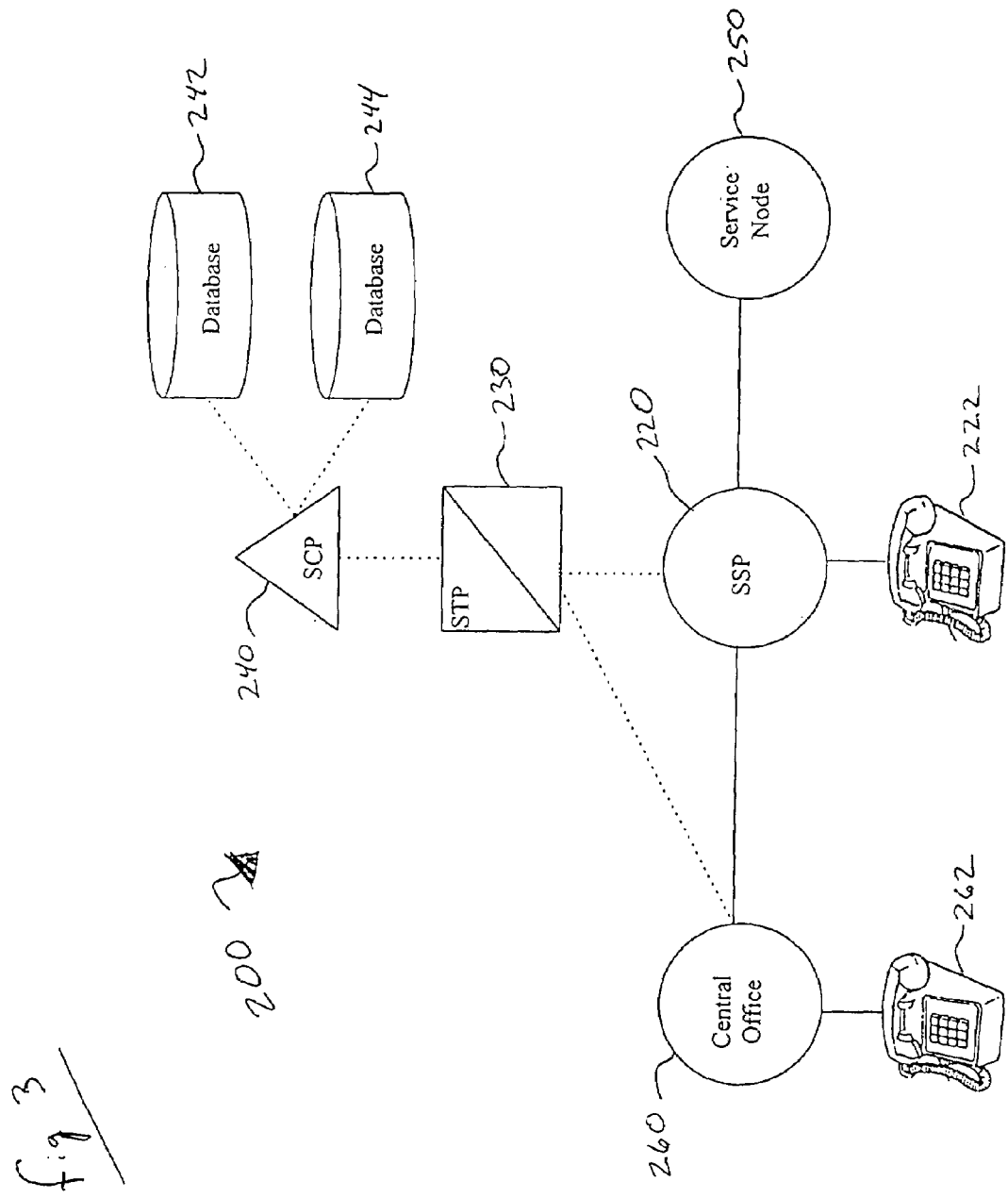

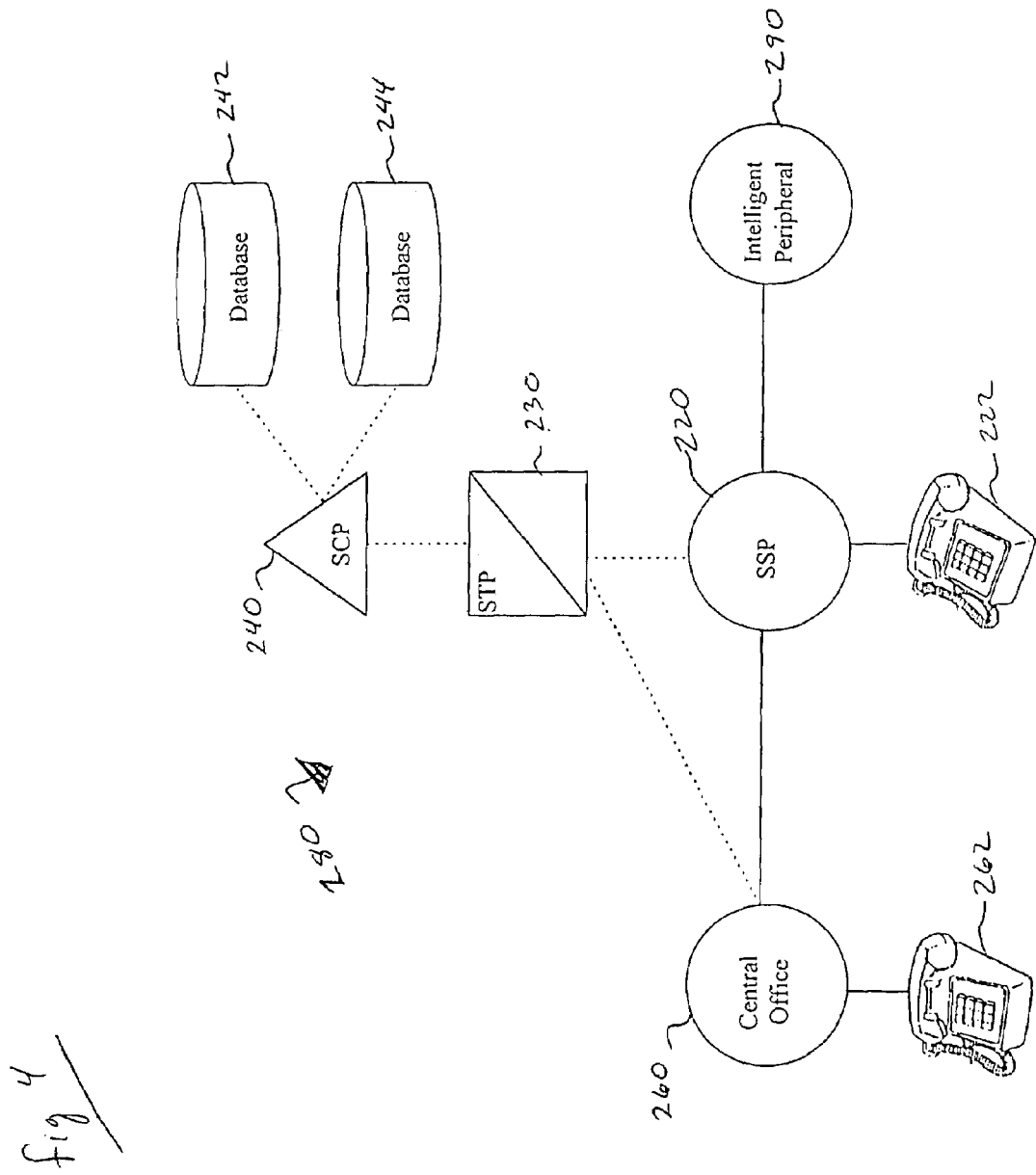

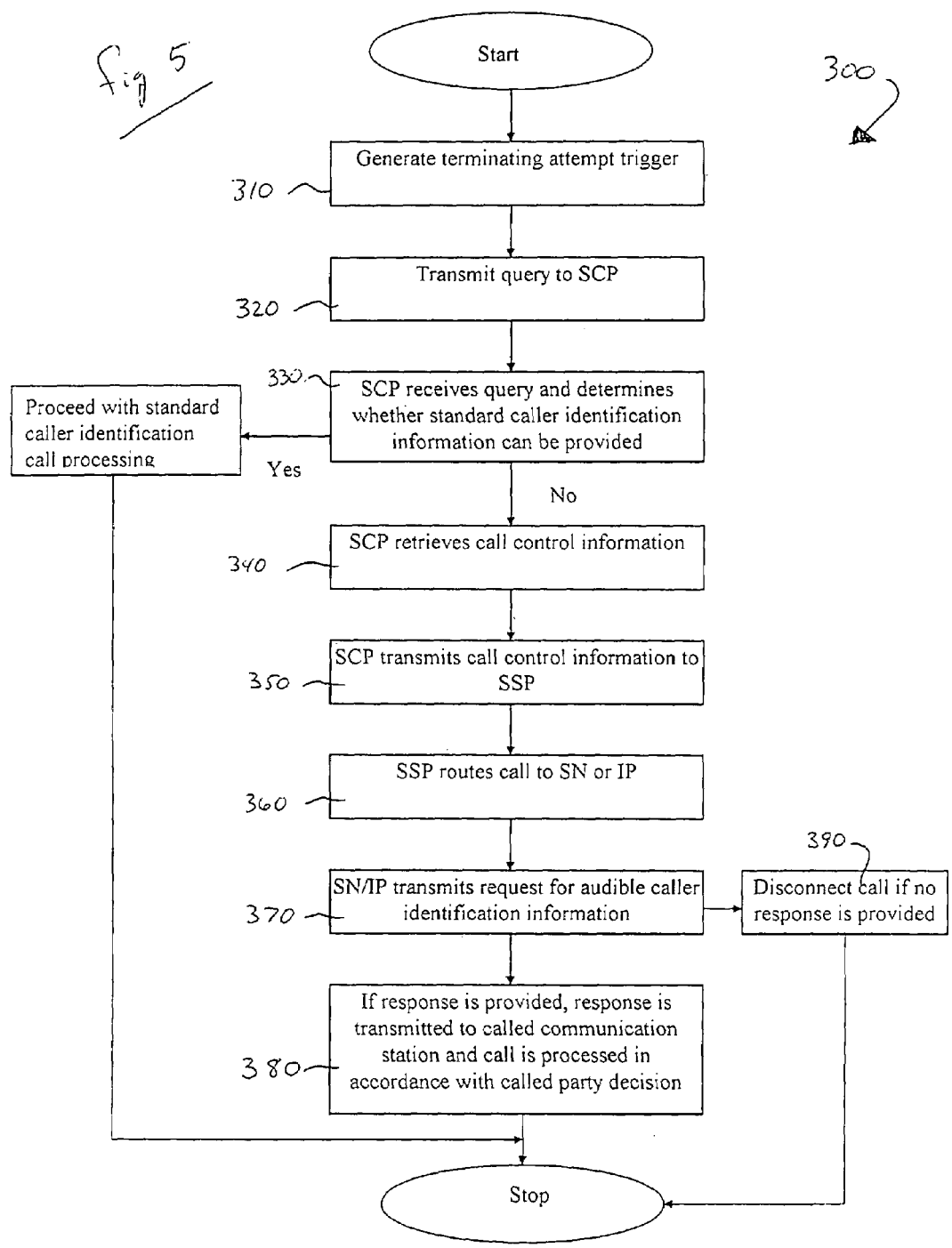

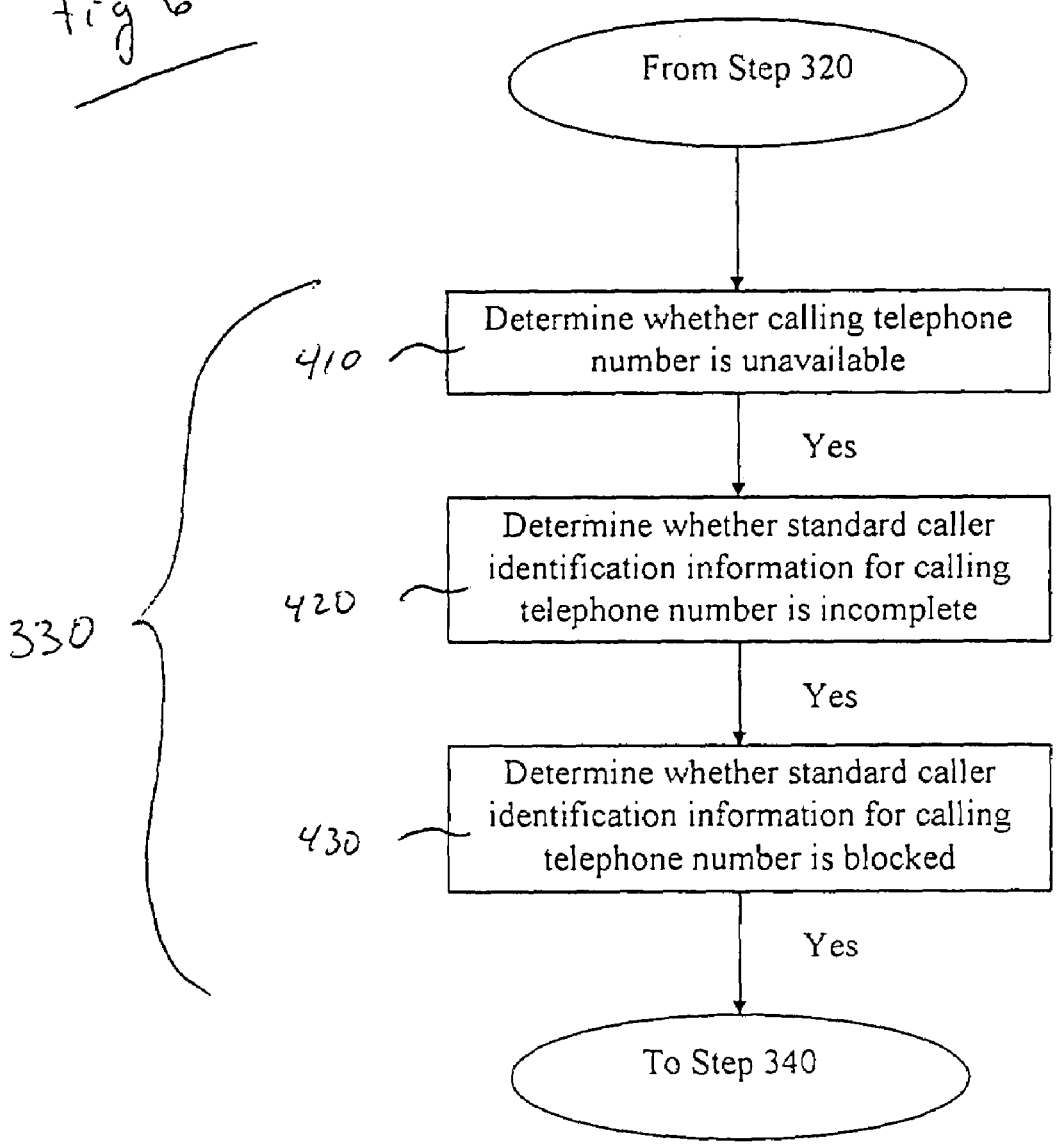

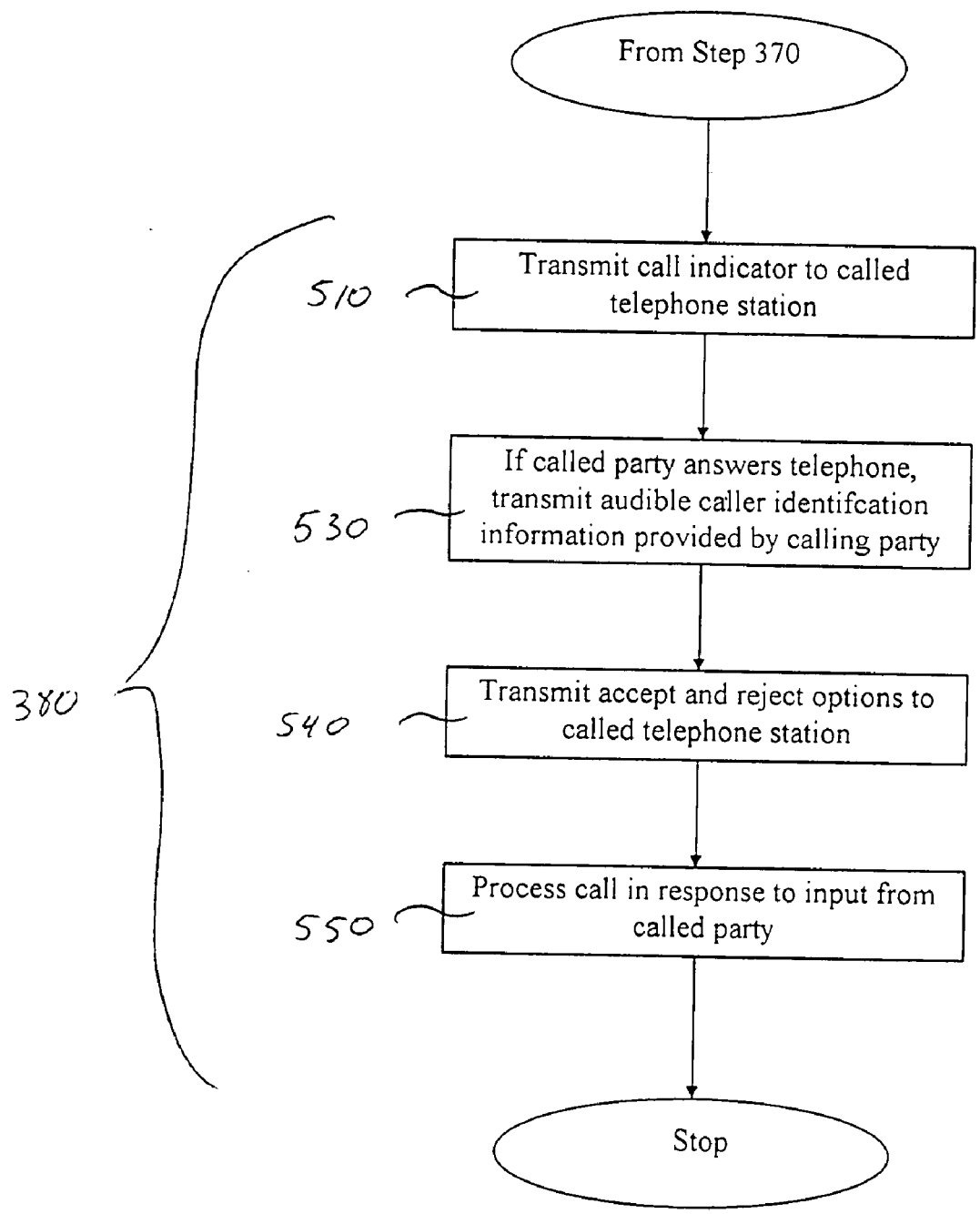

METHOD AND SYSTEM FOR PROVIDING ENHANCED CALLER IDENTIFICATION SCREENING USING AUDIBLE CALLER NAME ANNOUNCEMENT

This application is a continuation of application Ser. No. 09/122,165, filed Jul. 24, 1998 now U.S. Pat. No. 6,178,232, (which is incorporated by reference).

BACKGROUND

The present invention relates generally to telecommunications services and more particularly to caller identification.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One common occurrence that decreases the effectiveness of Caller ID systems is the inability of a service provider to provide the standard Caller ID information for a particular incoming call. A service provider may not be able to provide the standard Caller ID information if the Caller ID information is blocked by the calling party, or if the Caller ID information is unavailable or incomplete. When the standard Caller ID information cannot be provided, the called party is not adequately informed about who is calling and cannot determine whether or not to accept the incoming call before answering the call. Because the effectiveness of Caller ID systems is greatly reduced when information cannot be provided, an improved system and method for providing caller identification information that overcome these deficiencies are needed.

BRIEF DESCRIPTION OF THE DRAWINGS

FIG. 1 is a block diagram of a telecommunications system of a preferred embodiment.

FIG. 2 is a flow chart of a method of a preferred embodiment for providing enhanced caller identification.

FIG. 3 is a block diagram of a first preferred embodiment of the telecommunications system of FIG. 1.

FIG. 4 is a block diagram of a second preferred embodiment of the telecommunications system of FIG. 1.

FIG. 5 is a flow chart of a method of a preferred embodiment for providing enhanced caller identification using the system of FIG. 3 or 4.

FIG. 6 is a more detailed flow chart of a portion of the method of FIG. 5.

FIG. 7 is a more detailed flow chart of a portion of the method of FIG. 5.

DETAILED DESCRIPTION OF THE PRESENTLY PREFERRED EMBODIMENTS

By way of introduction, the preferred embodiments described below include a method and system for providing a called party with audible caller identification information when standard caller identification information cannot be provided. In one embodiment, calls for which standard caller identification information is blocked, unavailable or incomplete are prevented from being connected to the called party. Instead of connecting the calls, a request for audible caller identification information is transmitted to the calling party. If the calling party provides the requested audible caller identification information, the audible information is transmitted to the called party. Caller identification information can thus be provided to the called party when standard caller identification information cannot be provided.

By way of example, FIG. 1 depicts a system 10 of a preferred embodiment. The system 10 comprises a network 20, a called communication station 30 coupled with the network 20 and a calling communication station 40 coupled with the network 20. The term "coupled with," as used herein, means directly coupled with or indirectly coupled with through one or more components. The network 20 preferably comprises computer usable medium having first, second and third computer readable program codes 22, 24, 26 embodied therein. It is important to note that while the program codes 22, 24, 26 have been shown as three separate elements, their functionality can be combined and/or distributed. It is also important to note that "medium" is intended to broadly include any suitable medium including analog or digital, hardware or software, now in use or developed in the future.

The system 10 is preferably implemented in a telecommunications network as known to those skilled in the art. Alternatively, the system 10 can be implemented in a computer network or any other network that is adapted to transmit, store and retrieve information. The calling communication station 40 and the called communication station 30 preferably comprise analog telephone stations as known to those skilled in the art. According to an alternative embodiment, the communication stations 30, 40 can comprise any suitable communication station adapted for use in the present embodiments as known to those skilled in the art.

The system 10 of FIG. 1 can be used to implement the method 100 depicted in FIG. 2. When the calling party at the calling communication station 40 places a call to a called party at the called communication station 30, the first computer readable program code 22 determines whether standard caller identification information associated with the calling communication station 40 can be provided to the called communication station 30 (step 110, FIG. 2). As used herein, the term standard caller identification (Caller ID) information means the information associated with a calling communication station that is typically stored in a database and automatically retrieved and provided to a called party as known to those skilled in the art. If it is determined that standard caller identification information cannot be provided, the second computer readable program code 24 transmits a request for audible caller identification information to the calling communication station 40 (step 120). As used herein, the term audible caller identification information means audible information provided by the calling party in response to a request for such information. If the calling party provides the requested audible caller identification information, the third computer readable program code 26 transmits the audible caller identification information to the called communication station 30 (step 130). After receiving the audible caller identification information, the called party can decide whether to proceed with the call or cancel the call (step 140).

By way of further example, FIG. 3 depicts a preferred embodiment of the system 10 described above. The system 200 comprises a service switching point (SSP) 220, a signal transfer point (STP) 230, a service control point (SCP) 240, a first SCP database 242, a second SCP database 244, a service node (SN) 250, a central office 260, called telephone station 222 and calling telephone station 262. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 220 preferably comprises an AIN switch that routes calls, recognizes and responds to triggers, generates queries to obtain call information and responds to returned call information. SSP 220 connects called telephone station 222 with central office 260 to enable a calls to be placed between called telephone station 222 and calling telephone station 262. SSP 220 preferably communicates with SCP 240, central office 260 and SN 250 by utilizing a signaling protocol such as Signaling System 7 (SS7) or other such signaling protocols as presently known to those skilled in the art or developed in the future. SSP 220 preferably generates queries to SCP 240 and receives and responds to responses to the queries returned from SCP 240.

STP 230 preferably comprises a network element that transfers signaling communications in response to signaling protocols such as SS7 or other such signaling protocols as presently known to those skilled in the art or developed in the future. STP 230 preferably transfers queries from SSP 220 to SCP 240 and transfers responses to the queries from SCP 240 to SSP 220.

SCP 240 preferably comprises an AIN element that stores call information and receives and responds to queries. SCP 240 preferably stores call control information in the first SCP database 242 and can access the stored call control information. SCP 240 also stores standard caller identification information in the second SCP database 244 and can access the stored caller identification information. SCP 240 receives queries generated by SSP 220 and preferably responds to the queries by performing database searches to locate the requested call control information or caller identification information as known to those skilled in the art. SCP 240 can forward the call control information or caller identification information to SSP 220.

SN 250 preferably comprises a network element that enables communications between telephone stations 222, 262 and the network. SN 250 can preferably transmit messages to and receive responses from telephone stations 222, 262. SN 250 can generate announcements that can be transmitted to telephone stations 222, 262. SN 250 can transmit responses such as audible caller identification information from telephone station 262 to telephone station 222 by connecting telephone stations 222, 262 or by recording and playing back the responses ask known to those skilled in the art. SN 250 can preferably receive and respond to input transmitted from telephone station 222. The term input means a suitable signal such as DTMF tones as known to those skilled in the art.

Database 242 preferably comprises a data storage element for use with SCP 240 as known to those skilled in the art. Database 242 preferably stores call control information that can be implemented by SSP 220 to control calls. Such call control information is known to those skilled in the art.

Database 244 preferably comprises a standard caller identification with name database as known to those skilled in the art. Database 244 preferably includes the name of the person associated with calling telephone station 262 along with the telephone number that is associated with calling telephone station 262. Database 244 can alternatively comprise a caller assistance database as known to those skilled in the art. While databases 242, 244 are depicted within a telecommunications system, databases 242, 244 can comprise any suitable databases containing information adapted for use in the present embodiment and are not limited to databases located within a telecommunications network. It is also important to note that while databases 242, 244 are shown as separate components, they can be implemented as a single database.

Central office 260 preferably comprises an AIN network switch as known to those skilled in the art. Central office 260 enables calls to be placed between calling telephone station 262 and called telephone station 222. Alternatively, central office 260 can comprise a non-AIN network switch as known to those skilled in the art.

Telephone stations 222, 262 preferably comprise analog telephone sets as known to those skilled in the art. Alternatively, telephone stations 222, 262 can comprise wireless, PCS, ISDN or any other form of communication station known to those skilled in the art.

Referring now to FIG. 4, an alternate embodiment of the system of FIG. 3 is shown. The system 280 comprises an SSP 220; a called telephone station 222; an STP 230, an SCP 240; a first SCP database 242, a second SCP database 244, a central office 260 and a calling telephone station 262, all as described above in reference to FIG. 3. The system 280 also includes an intelligent peripheral (IP) 290 that communicates with SSP 220 and performs the same functions as SN 250 as described herein.

The systems depicted in FIGS. 3 and 4 can be utilized to implement the method 300 depicted in FIG. 5. For purposes of illustration, assume that a calling party at calling telephone station 262 places a call to a called party at called telephone station 222. In an attempt to connect the call, central office 260 routes the call to SSP 220.

In this embodiment, when the call is routed to SSP 220, a terminating attempt trigger is activated (step 310) when SSP 220 attempts to connect the call to called telephone station 222. The trigger generates a query that is sent to SCP 240 (step 320). The query preferably includes a calling party identification parameter which can include a calling party presentation restriction indicator as known to those skilled in the art and requests the return of standard Caller ID information. The telephone number associated with the calling telephone station 262 is preferably included in the calling party identification parameter of the query as known to those skilled in the art. SCP 240 receives the query and determines whether or not the called party at called telephone station 222 subscribes to the present service. In response to a determination that the called party subscribes to the present service, SCP 240 analyzes the information included with the query to determine whether or not standard Caller ID information can be provided to called telephone station 222 (step 330).

If the standard Caller ID information cannot be provided, SCP 240 accesses database 242 to retrieve call control information (step 340) and returns the call control information to SSP 220 (step 350). The call control information can be sent to SSP 220 in response to a lead directory number that uniquely identifies each SSP as known to those skilled in the art. In response to the call control information, SSP 220 routes the call to SN 250 or IP 290 (step 360). When SN 250 or IP 290 receives the call, SN 250 or IP 290 generates a request for audible caller identification information that is transmitted to the calling telephone station 262 (step 370). The request preferably comprises a statement indicating that the called party doesn't accept calls from unidentified callers and a request for the calling party to speak his/her name. The request preferably comprises an audible message. If the calling party provides an audible response, SN 250 or IP 290 enables the audible response to be transmitted to called telephone station 222 (step 380). Alternatively, if the calling party does not provide the requested information, the call is canceled (step 390).

The step of determining whether standard Caller ID information can be provided (step 330, FIG. 5) preferably comprises the steps shown in FIG. 6. The SCP 240 preferably first determines whether standard Caller ID information is unavailable (step 410). The SCP 240 preferably determines whether the standard Caller ID information is unavailable by determining whether or not the calling party identification parameter is present in the query as known to those skilled in the art. In addition, SCP 240 preferably determines whether the standard Caller ID information is incomplete (step 420). SCP 240 preferably determines whether the standard Caller ID information is incomplete by determining whether or not the calling party identification parameter is a valid telephone number as known to those skilled in the art. In addition, SCP 240 preferably determines whether the standard Caller ID information has been blocked (step 430). SCP 240 preferably determines whether the standard Caller ID information has been blocked by determining whether or not the calling party identification presentation restriction indicator is set to "presentation restricted" as known to those skilled in the art.

The step of providing the audible caller identification information to the called party (step 380, FIG. 5) preferably comprises the steps shown in FIG. 7. Preferably, called telephone station 222 rings (step 510) to signify that a call has been placed to called telephone station 222. If the called party answers the telephone (i.e. the telephone is off hook), the audible caller identification information that was provided by the calling party is transmitted to called telephone station 222 (step 530). The audible caller identification information is preferably recorded and played back to the called telephone station 222 as known to those skilled in the art. Alternatively, the calling telephone station 262 and the called telephone station 222 can be connected such that the audible caller identification information can be transmitted between the telephone stations 262, 222. After the audible caller identification information has been transmitted, a message is transmitted to called telephone station 222 (step 540). The message preferably includes instructions that allow the called party to accept or reject the call by providing the appropriate input. The message preferably comprises audible instructions that are transmitted by SN 250 or IP 290 to called telephone station 222. The accept and reject options preferably comprise, accepting the call by enabling the connection of the call to the called telephone station 222 or canceling the call by disabling the connection of the call to the called telephone station 222. The connection of the call preferably occurs when the called party provides the appropriate input. The input can comprise a suitable signal such as DTMF tones as known to those skilled in the art. The canceling of the call preferably occurs when the called party hangs up the called telephone station 222 (i.e., the telephone station is placed on hook). In response to input provided by the called party, SN 250 or IP 290 can process the call (step 550) by connecting or canceling the call.

The present embodiments provide an efficient and effective method and system for providing caller identification information to a customer when traditional caller identification information is unavailable, incomplete, or blocked.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

We claim:

1. A method for processing a call from a calling party at a calling communication station to a called communication station, the method comprising:
   (a) determining whether standard caller identification information for the calling communication station can be provided to the called communication station by analyzing data contained within a query, wherein the data includes an indication of whether or not there is a restriction on the presentation of the standard caller identification;
   (b) transmitting a request for audible caller identification information to the calling communication station in response to a determination that the standard caller identification information cannot be provided to the called communication station; and
   (c) transmitting the audible caller identification information to the called communication station if the calling party provides audible caller identification information.

2. The method of claim 1, wherein (a) comprises determining whether caller identification information for the calling communication station is unavailable by analyzing data contained within a query.

3. The method of claim 1, wherein (a) comprises determining whether caller identification information for the calling communication station is incomplete by analyzing data contained within a query.

4. The method of claim 1, wherein (a) comprises determining whether caller identification information for the calling communication station has been blocked by analyzing data contained within a query.

5. The method of claim 1, wherein (b) comprises transmitting a request for the calling party to speak his or her name.

6. The method of claim 1, wherein (b) comprises:
   (b1) transmitting a message indicating that the called communication station does not accept calls from an unidentified calling party and
   (b2) transmitting a request for the calling party to speak his or her name.

7. The method of claim 1, wherein (c) comprises:
   (c1) recording the audible caller identification information and
   (c2) transmitting the recorded audible caller identification information to the called communication station.

8. The method of claim 1, further comprising transmitting a message to the called communication station, the message comprising accept and reject options.

9. The method of claim 1, further comprising transmitting a request for input from the called communication station.

10. The method of claim 8, wherein the message comprises audible instructions.

11. The method of claim 1, further comprising connecting the calling communication station with the called communication station in response to input from the called communication station.

12. The method of claim 1, further comprising connecting the calling communication station with the called communication station in response to dual tone multi-frequency tones transmitted from the called communication station.

13. The method of claim 1, further comprising canceling the call in response to the called communication station being placed on hook.

14. A method for processing a call from a calling party at a calling communication station to a called communication station, the method comprising:
   (a) determining whether standard caller identification information for the calling communication station can be provided to the called communication station by analyzing data contained within a query, wherein the data includes an indication of whether or not there is a restriction on the presentation of the standard caller identification;
   (b) transmitting a request for audible caller identification information to the calling communication station in response to a determination that the standard caller identification information cannot be provided to the called communication station;
   (c) receiving audible caller identification information from the calling party;
   (d) causing the called communication station to ring; and
   (e) transmitting the audible caller identification information to the called communication station in response to the called communication station being placed off hook.

15. The method of claim 14, wherein (b) comprises:
   (b1) transmitting a message indicating that the called communication station does not accept calls from an unidentified calling party and
   (b2) transmitting a request for the calling party to speak his or her name.

16. The method of claim 14, further comprising transmitting a message to the called communication station, the message comprising accept and reject options.

17. The method of claim 14, further comprising transmitting a request for input from the called communication station.

18. The method of claim 14, further comprising connecting the calling communication station with the called communication station in response to input from the called party.

19. The method of claim 14, further comprising connecting the calling communication station with the called communication station in response to dual tone multi-frequency tones transmitted from the called communication station.

20. The method of claim 14, further comprising canceling the call in response to the called communication station being placed on hook.

* * * * *